United States Patent [19]

Viers

[11] 4,277,092
[45] Jul. 7, 1981

[54] SUPPLE EXHAUST COUPLING

[75] Inventor: Homer J. Viers, Flint, Mich.

[73] Assignee: General Motors Corporation, Detroit, Mich.

[21] Appl. No.: 58,789

[22] Filed: Jul. 19, 1979

[51] Int. Cl.³ .............................................. F16L 27/04
[52] U.S. Cl. .................................. 285/263; 285/268; 285/368
[58] Field of Search ............... 285/263, 267, 261, 234, 285/187, 9 R, 368, 268, 269

[56] References Cited

U.S. PATENT DOCUMENTS

| | | | |
|---|---|---|---|
| 985,155 | 2/1911 | Fournia | 285/261 X |
| 3,188,115 | 6/1965 | Morrish et al. | 285/18 |
| 4,097,071 | 6/1978 | Crawford et al. | 285/267 X |

FOREIGN PATENT DOCUMENTS

| | | | |
|---|---|---|---|
| 2746996 | 4/1979 | Fed. Rep. of Germany | 285/263 |
| 531930 | 1/1941 | United Kingdom | 285/263 |

*Primary Examiner*—Thomas F. Callaghan
*Attorney, Agent, or Firm*—J. C. Evans

[57] ABSTRACT

A flexible coupling for use in engine exhaust systems includes a pair of flanges maintained at a fixed distance with respect to one another by a pair of spaced shouldered bolt components and wherein one of the fixed flanges has a free end directed therefrom supportingly receiving a ring seal with a spherical surface thereon; and wherein the other of the flanges includes an edge portion thereon bent over to form a spring seat and to define a pipe opening to receive a spherically flared end of a downstream pipe and supportingly receiving one end of a coil spring that surrounds the downstream pipe, the coil spring having the opposite end thereof supported by one of the spaced flanges and a movable retainer ring on an outer spherical surface of the spherically flared end whereby a resilient force is maintained continuously around the outer surface of the flared end of the downstream pipe to bias it into sealing engagement with the ring seal and to force the ring seal into a sealed shouldered relationship with the fixed flange of the assembly during angular movement between the fixed flange and a downstream pipe component.

3 Claims, 4 Drawing Figures

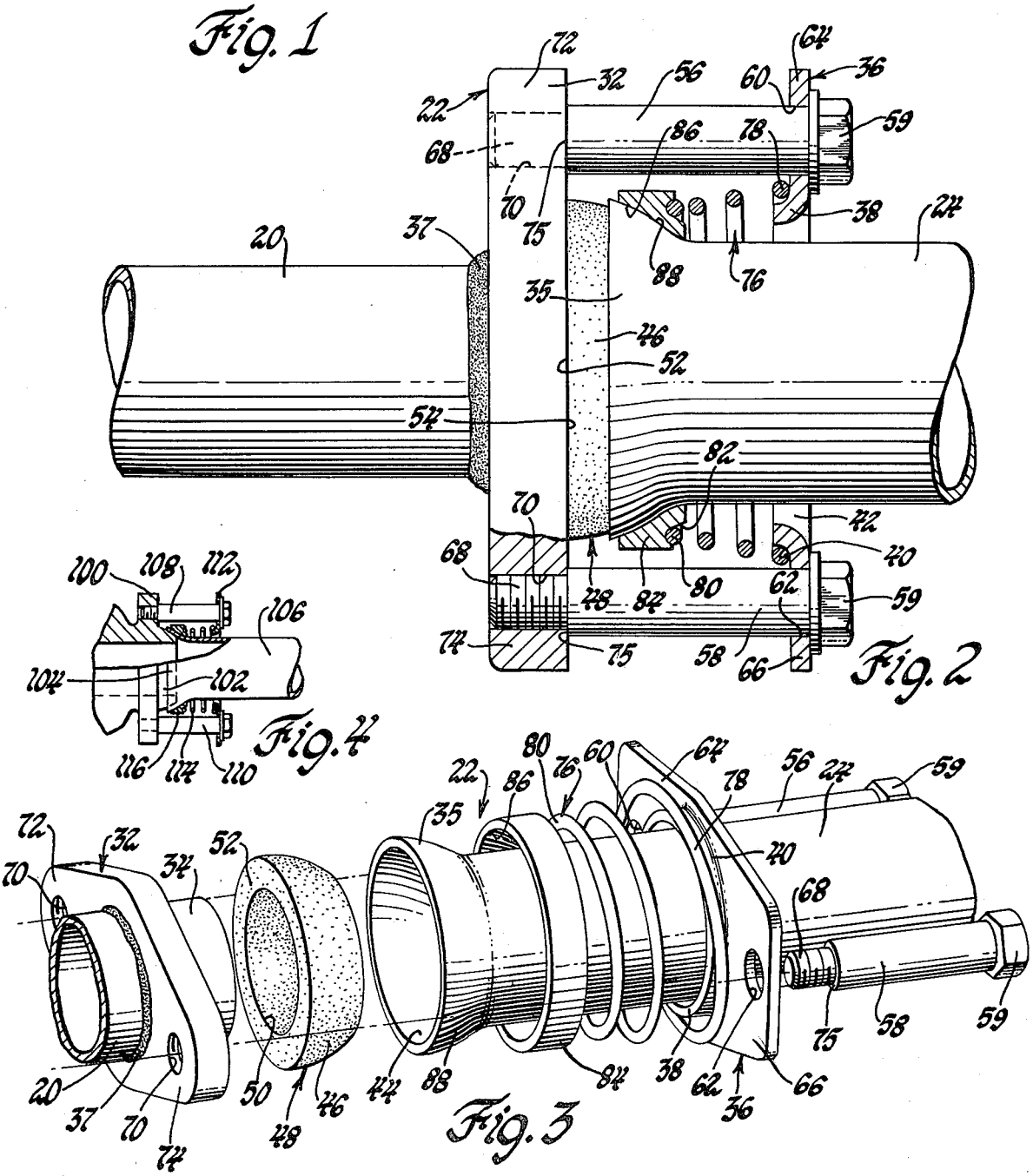

SUPPLE EXHAUST COUPLING

This invention relates to spring loaded exhaust pipe couplings for connecting pipe components in a vehicle exhaust system and more particularly to such spring loaded exhaust couplings having spring retaining bolts located in a plane which moves in accordance with the plane of angulation of exhaust components connected to either end of the coupling.

Various proposals have been suggested to accommodate angulation of exhaust components connected to a spherical joint type, spring biased coupling in an exhaust system of a motor vehicle whereby the sealed surfaces of the coupling are biased together and are movable to accommodate pipe movements during vehicle operation.

Spherical type exhaust couplings are known such as in U.S. Pat. No. 3,188,115 issued June 8, 1965, to Morrish et al where an exhaust pipe is directly connected to the exhaust manifold by an external double spherical fitting configured to accommodate a slight angular offset between the exhaust pipe and the exhaust manifold. In such arrangements an outer spherical fitting component is spring biased against an intermediate spherical fitting to hold it on a spherical seat of the exhaust manifold. The double spherical fitting maintains a spring bias on a sealed joint between the exhaust manifold and the intermediate spherical fitting through wide temperature excursions without accommodating the angulation movements, for example, of type found in a transversely mounted engine exhaust system.

Another proposal in a spherically configured exhaust coupling set forth in U.S. Pat. No. 4,097,071, issued June 27, 1978, to Crawford et al for "Flexible Exhaust Coupling." It has a flange firmly secured to each of first and second pipes at points offset from free ends on each of the pipes and it also has an interposed seal element supported between the free ends with a spherical seal surface of low friction engageable with a spherical flared surface on one of the free ends. The flanges are interconnected by a pair of attachment bolts threaded to one flange and spring coupled to the other flange so that the spherical joint surface on one of the free ends is continuously spring biased against the spherical seal surface and yet is free to pivot with respect thereto while defining a continuous annular seal surface therebetween throughout substantial angular movements between the first and second pipes.

An object of the present invention is to provide an improved flexible exhaust coupling for use in engine exhaust systems including a first fixed exhaust component having an annular spherical seal surface thereon in engagement with an interior spherical surface on a flared end of a pipe surrounded by a spacer flange that is connected to the fixed exhaust component by a pair of shouldered bolts and wherein the spacer flange has an internal opening therethrough to receive the pipe and define a spring seat for a 360° coil spring located around the pipe and having one end thereof forced by the spacer flange against a spring seat on a movably adjustable retainer ring located on the outer surface of the flared end of the pipe wherein the retainer ring floats on the outer surface of the flared end to uniformly direct a full circle spring force on the mating surfaces of the seal surface and the inside spherical surface of the flared end of the pipe thereby to maintain a full sealed mating surface within the coupling during substantial angular movements between the fixed exhaust component and the downstream pipe of the exhaust system.

Another object of the present invention is to provide an improved flexible exhaust coupling for use in engine exhaust systems including a first fixed flange having a free end extending therefrom supportingly receiving an annular seal element having a spherical end seal surface of low friction, high temperature-resistant material in engagement with an interior spherical surface on a flared free end of a downstream pipe surrounded by a spacer flange that is connected to the fixed flange by a pair of shouldered bolts and wherein the spacer flange has an internal opening therethrough to receive the downstream pipe and define a spring seat for a 360° coil spring located around the downstream pipe and having one end thereof forced by the spacer flange against a spring seat on a movably adjustable retainer ring located on the outer surface of the flared end of the pipe wherein the retainer ring floats on the outer surface of the flared end to uniformly direct a full circle spring force on the mating surfaces of the annular seal and the inside spherical surface of the flared end of the free end thereby to maintain a full sealed mating surface within the coupling during substantial angular movements between the fixed flange and the downstream pipe of the exhaust system.

Still another object of the present invention is to provide an improved, flexible exhaust coupling for use in engine exhaust systems including a pipe with a sealed flange and a first free end and a spacer flange surrounding a pipe with a second free end telescoped with the first free end to define a space therebetween occupied by an annular seal element having a spherical end seal surface with a low friction, high temperature resistant material and in engagement with a seal surface on a spherical flare on the second free end and wherein the spacer flange supports one end of a circumferentially formed 360° coil spring biased against a movably adjustable retainer ring on the outer surface of the spherical flare; and wherein the retainer ring floats on the outer surface to uniformly direct full circle spring force on the mating surfaces of the annular seal and the inside of the spherical flare to maintain full sealed mating coupling surfaces during substantial angular movement between the two pipes.

Further objects and advantages of the present invention will be apparent from the following description, reference being had to the accompanying drawings wherein a preferred embodiment of the present invention is clearly shown.

FIG. 1 is a diagrammatic view of an engine exhaust system including the present invention;

FIG. 2 is a side elevational view of the coupling of the present invention, partially sectioned;

FIG. 3 is a view in perspective showing the component parts of the invention in an exploded relationship; and FIG. 4 is a view like FIG. 3, but reduced, showing another embodiment of the invention.

In FIG. 1, a front located, transversely mounted engine 10 is illustrated having a roll axis 12 arranged generally transversely to the longitudinal extent 14 of the vehicle.

The engine includes exhaust pipes 16, 18 joined at a single outlet pipe 20 that is joined by a coupling 22, constructed in accordance with the present invention, to a pipe 24 leading to a downstream, exhaust gas converter 26. An outlet pipe 28 from the converter 26 is connected by a second coupling 30 to downstream exhaust components.

When an engine is supported transversely in a vehicle support system including resilient engine mounts, it rolls about an axis transverse to the longitudinal axis of downstream pipe components of an exhaust system associated with the engine. Furthermore, such engines are susceptible to vertical displacement and yaw movements that all combine to direct a substantial rolling movement between an exhaust pipe component leading to an exhaust system and the remainder of the downstream components in the exhaust system. In such arrangements the longitudinal extent of the exhaust system must withstand bending offset and thermal expansion forces thereon while retaining a gas tight seal between the interconnected components.

Each of the exhaust couplings 22, 30 is specifically configured to accommodate bending by rocking motion of the joint and to do so by means of a unique interconnection between first and second pipe components that enable the interconnected pipe components to be freely moved through substantial angular offsets without resistance to such movement of the pipe components and to do so while maintaining a tight gas seal at a sealed joint in the coupling.

More particularly, in the illustrated arrangement the coupling 22 is detailedly set forth in FIGS. 2 and 3 with it being understood that coupling 30 is identical. Coupling 22 has a seal flange 32 located in surrounding relationship to the outer periphery of the exhaust pipe 20 and upstream of a free end 34 on pipe 20. Free end 34 extends inboard of the coupling 22 from the seal flange 32 and in telescoped relationship to a flared end 35 on pipe 24. The flange 32 is fixedly secured to the exhaust pipe 20 by a circumferential weldment 37 that securely fastens the seal flange 32 against movement with respect to the exhaust pipe 20. Weldment 37 is continuously circumferentially formed and is of a density to be gas tight thereby to seal the flange 32 to pipe 20.

The coupling further includes a spacer flange 36 which surrounds pipe 24 and has an inner edge 38 bent to form a spring seat 40. The edge 38 forms a pipe access opening 42 for pipe 24 which is sized to permit free movement of pipe 24 in a conical path around its longitudinal axis. Flared end 35 is flared radially outwardly to form an inboard spherical seal surface 44 spaced radially of and extending circumferentially around the outer surface of flared end 35.

The spherical seal surface 44 is supportingly received on a spherical surface 46 of a ring seal 48 that is located interiorly of the coupling 22 to serve as a load transfer component between the free end 34 and the flared end 35. More particularly, the ring seal 48 includes an axial bore 50 therethrough in which the outer surface of the free end 34 is inserted to support the ring seal 48. The ring seal 48 further includes a radially outwardly directed seal surface 52 thereon that engages an inboard shoulder 54 on the flange 32 to define a sealed joint therebetween. In one working embodiment ring seal 48 is made of compressed sheets of graphite laminated to S.A.E. 1009 steel foil. The graphite has 80% minimum type GTC graphite with a part density of 2.6 g/cm$^3$ + 10%.

The separated parts shown in FIG. 3 are joined together in the working embodiment by a pair of bolts 56, 58, each having a head 59. The bolts 56, 58 are directed through holes 60, 62, respectively, formed through side ears 64, 66 of the flange 36. Each of the bolts 56, 58 further includes a threaded end 68 that is threadably received within a tapped hole 70 in ear portions 72, 74 of the seal flange 32. The seal flange 32 is coupled to the spacer flange 36 by the bolts 56, 58 which are threaded into the flange 32 until a shoulder 75 on each bolt 56, 58 is in contact with the shoulder 54. A conical coil spring 76 is supported in surrounding relationship to the pipe 24. More particularly, the spring 76 has a large diameter end 78 in engagement with spring seat 40 on the spacer flange 36. An opposite small diameter end 80 of spring 76 is seated against an outboard seat 82 on a retainer ring 84 which has a spherical inboard surface 86 in sliding engagement with an outboard spherical surface 88 on end 35 as best seen in FIG. 2. The spacer flange 36 thus serves as a ground point to force the spring 76 against retainer ring 84 which in turn forces the flared end 35 against the spherical surface 46 of ring seal 48.

In the illustrated application of FIG. 1, spring 76 surrounds the coupling 22 and is continuously adjustably positioned as the retainer ring 84 assumes an equilibrium position on flared end 35 depending upon the angularity between pipes 20, 24 to thereby direct a uniform contact force throughout 360° of the sealed surface between ring seal 48 and the inboard surface 44 of flared end 35. Such an arrangement keeps a constant axial load on the sealed joint by forcing the spherical surface 44 against the spherical surface 46 of the ring seal 48. Surface 52 is also forced against flange 32 into sealing engagement therewith. The axial force is maintained throughout angular offset movements between the pipes 20, 24 as produced during engine roll and the like. The spring 76 is located at the large diameter end thereof by the spacer flange 36 and at the opposite end by the seat 82 so that flexing in the spring 76 takes place between these two anchor points without hindering angular movement of pipe 24.

Thus, pivotal movement of surface 44 on surface 46 is able to accommodate roll movements of engine 10. More specifically, such movement is transmitted from the engine 10 through bolts 56, 58, spring 76 and sliding retainer ring 84 to accommodate angular offset between the longitudinal axes of ends 34, 35.

The spherical surface 46 of the ring seal 48 includes a special low friction high temperature resistant lubricant such as graphite. Other low friction, high temperature lubricants are equally suited for use in the present invention. The use of such lubricant assures reduced frictional resistance against the free rocking movement of the surface 46 with respect to the surface 44.

The illustrated seal is self-lubricating and anti-oxidant and will withstand temperatures in excess of 1000° F. The coupling 22 flexes continually and yet maintains a complete circumferential seal between the annular spherical surface 44 on the free end 35 with respect to the spherical surface 46 on the ring seal 48. Radial seal along the seal flange 32 is maintained by the axial force component provided by the conical coil spring 76 as it forces the seal flange 32 and the reference shoulder 54 thereon with respect to the radial seal surface 52 of the ring seal 48. Any tendency for leakage along the outer surface of the free end 34 is sealed by the continuously formed gas tight weldment 37 between the outboard face of the seal flange 32 and the exhaust pipe 20.

As best shown in FIG. 4, the present invention is equally adaptable to attachment of an exhaust pipe to an engine manifold. In this case, a manifold flange 100 has a spherical ring seal 102 formed as part of the flange or supported thereon as the ring seal 48 is supported on the free end 34 extending from the pipe 20. Ring seal 102 has an exhaust passage therethrough in communication with the interior of the manifold and exhaust pipe 106. Ring seal 102 is in sealing engagement with a flared end 104 of an exhaust pipe 106 and is slidably sealed thereagainst by a spring biasing system including a pair of bolts 108, 110 corresponding to the bolts 56, 58 in the embodiment of FIGS. 1 through 3 to secure a spacer flange 112 corresponding to the spacer flange 36 in the first embodiment to locate a coil spring 114 formed circumferentially around exhaust pipe 106 and corresponding to the coil spring 76 of the first embodiment thereby to bias a retainer ring 116 on the flared end 104 of exhaust pipe 106 to force it against the ring seal 102 on the manifold flange 100.

In both embodiments, the retainer rings 84, 116, springs 76, 114 and spacer flanges 36, 112 can be packaged as an assembly to save time in installing the pipe on a spherical ball of a manifold or a separate insert made of graphoil or the like.

When installed, the spacer flange is solidly mounted in place but nevertheless is independent of the downstream pipe which it surrounds so that the pipe component, either an exhaust pipe in the embodiment of FIG. 4 or a coupling pipe in an exhaust system in the embodiments of FIGS. 1 through 3, is free to move in a conical path to adjust for angularity between upstream and downstream components of a vehicle exhaust system.

By virtue of this arrangement, there is no restriction of positioning a manifold flange as in the case where springs are located on individual bolts set forth in the prior flexible coupling assembly in U.S. Pat. No. 4,097,091 set forth above. Moreover, the full 360° positioning of mating seal surfaces and the wide range of angular adjustment between first and second pipe or manifold and exhaust pipe components in an exhaust gas system, as afforded by the present invention, enables substantial engine movements to be accommodated regardless of the type or position of engine mounts and allows the use of a common manifold when an engine is mounted in different vehicle arrangements, either in a transverse configuration as shown in FIG. 1 or in an in-line configuration either for front wheel or rear drive wheel applications.

While the embodiments of the present invention, as herein disclosed, constitute a preferred form, it is to be understood that other forms might be adopted.

The embodiments of the invention in which an exclusive property or privilege is claimed are defined as follows:

1. A flexible exhaust coupling assembly for maintaining a uniformly biased circumferential seal between exhaust flow segments subject to angular movement therebetween during exhaust flow therethrough comprising: an exhaust component having an exteriorly located spherical seal surface and an exhaust flow path therethrough, a pair of spaced bolts fixedly secured to said exhaust component and extending axially therefrom on either side of said spherical seal surface, head portions on each of said bolts located in spaced relationship to said exhaust component, a pipe having a flared free end formed continuously circumferentially therearound, said flared free end having a spherical outer surface and a spherical inner surface thereon, a spacer flange, means securing said spacer flange to said bolts at a point located in axially spaced relationship to said flared free end and having a center hole therein receiving said pipe and spaced therefrom radially to permit equally free universal angular movement of said pipe with respect to said exhaust component, and also with respect to said spacer flange, a spring retainer ring having a spherical surface thereon slidably supported for floating movement on said outer spherical seal surface, a coil spring surrounding said pipe having opposite ends thereon in engagement with said spacer flange and said retainer ring for biasing said retainer ring axially against said spherical outer surface and said retainer ring assuming an equilibrium position on said spherical outer surface to uniformly force said pipe against said spherical seal surface, said coil spring being spaced with respect to said pipe to permit angular movement thereof with respect to said exhaust component, said coil spring biasing said flared free end with respect to said spherical seal surface when the retainer ring is in its equilibrium position to maintain a uniformly continuous circumscribing spring pressure force therearound throughout the range of angular movement between said exhaust component and said pipe.

2. A flexible exhaust coupling assembly for maintaining a uniformly biased circumferential seal between an exhaust manifold outlet and an exhaust pipe subject to angular movement therebetween during exhaust flow therethrough comprising: an outer manifold surface having a spherical seal surface with an exhaust passage in communication with the interior of the manifold, a pair of spaced bolts fixedly secured to said manifold surface and extending axially therefrom on either side of said spherical seal surface, an exhaust pipe having a flared free end formed continuously circumferentially therearound, said flared free end having a spherical outer surface and a spherical inner surface thereon, a spacer flange, means securing said spacer flange on said bolts at a point located in axially spaced relationship to said flared free end and having a center hole therein receiving said exhaust pipe and spaced therefrom radially to permit equally free universal angular movement of said exhaust pipe with respect to said manifold surface and also with respect to said spacer flange, a spring retainer ring having a spherical surface thereon slidably supported for floating movement on said spherical outer surface, a coil spring surrounding said exhaust pipe having opposite ends thereon in engagement with said spacer flange and said retainer ring for biasing said retainer ring axially against said spherical outer surface and said retainer ring assuming an equilibrium position on said spherical outer surface to uniformly force said exhaust pipe against said spherical seal surface, said coil spring being spaced with respect to said exhaust pipe to permit angular movement thereof with respect to said manifold surface, said coil spring biasing said flared free end with respect to said spherical seal surface to maintain a uniformly continuous circumscribing spring pressure force therearound throughout the range of angular movement between said manifold surface and said exhaust pipe.

3. A flexible vehicle exhaust coupling assembly for maintaining a uniformly biased circumferential seal between exhaust system pipe segments subject to angular movement therebetween during exhaust flow therethrough comprising: a first pipe, a sealed flange supported on said first pipe, means for connecting said sealed flange to said first pipe and forming a continuous circumferential gas tight seal between said sealed flange and said first pipe, said first pipe having a tubular free end thereon extending axially beyond said sealed flange, a pair of spaced bolts fixedly secured to said sealed flange and extending axially therefrom on either side of said tubular free end, a second pipe having a flared free end formed continuously circumferentially therearound, said flared free end having a spherical outer surface and a spherical inner surface thereon, a spacer flange, means securing said spacer flange to said bolts at a point located in axially spaced relationship to said flared free end and having a center hole therein receiving said second pipe and spaced therefrom radially to permit equally free universal angular movement of said second pipe with respect to said first pipe and also with respect to said spacer flange, a ring seal spherical surface on said tubular free end with high temperature lubricant material in engagement with said spherical inner surface and freely relatively movable with respect thereto, a spring retainer ring having a spherical surface thereon slidably supported for floating movement on said spherical outer surface, a coil spring surrounding said second pipe having opposite ends thereon in engagement with said spacer flange and said retainer ring for biasing said retainer ring axially against said spherical outer surface, said coil spring being spaced with respect to said second pipe to permit angular movement thereof with respect to said first pipe, said retainer ring being movable to an adjusted equilibrium position on said outer spherical surface to accommodate angularity between said first and second pipes thereby to maintain said first and second pipes sealed with respect to one another, said coil spring biasing said flared free end with respect to said ring seal spherical surface when the retainer ring is in its equilibrium position to maintain a uniformly continuous circumscribing spring pressure force therearound throughout the range of angular movement between said first pipe and said second pipe.

* * * * *

UNITED STATES PATENT AND TRADEMARK OFFICE
CERTIFICATE OF CORRECTION

PATENT NO. : 4,277,092
DATED : July 7, 1981
INVENTOR(S) : Homer J. Viers

It is certified that error appears in the above-identified patent and that said Letters Patent are hereby corrected as shown below:

Column 5, line 33, "4,097,091" should read -- 4,097,071 --.

Column 6, line 5, "seal" should be deleted.

Signed and Sealed this

Seventeenth Day of November 1981

[SEAL]

Attest:

GERALD J. MOSSINGHOFF

Attesting Officer   Commissioner of Patents and Trademarks